United States Patent [19]

Takahashi et al.

[11] Patent Number: 5,031,405
[45] Date of Patent: Jul. 16, 1991

[54] HYDRAULIC RESERVOIR OF MASTER CYCLINDER

[75] Inventors: Toshiyuki Takahashi, Kanagawa; Ichiro Ishiwata, Yokosuka, both of Japan

[73] Assignee: Nippon Air Brake Company, Ltd., Kobe, Japan

[21] Appl. No.: 446,326

[22] Filed: Dec. 5, 1989

[30] Foreign Application Priority Data

Dec. 6, 1988 [JP] Japan .............................. 63-158847[U]

[51] Int. Cl.⁵ .......................... B60T 11/26; F15B 7/08; H01H 35/18
[52] U.S. Cl. ........................................ 60/585; 92/5 R; 200/84 C; 73/308; 340/624; 324/207.12
[58] Field of Search ................ 92/5 R; 91/1, DIG. 4; 60/562, 585, 533; 324/207.13, 207.14, 207.12, 207.26, 262, 226, 225; 73/DIG. 5, 308, 313; 340/624; 200/84 C

[56] References Cited

U.S. PATENT DOCUMENTS

| | | | |
|---|---|---|---|
| 4,057,700 | 11/1977 | Nakashima | 340/624 |
| 4,488,404 | 12/1984 | Arakawa | 60/585 |
| 4,500,761 | 2/1985 | Kubota et al. | 60/585 |
| 4,513,184 | 4/1985 | Hughes | 200/84 C |
| 4,673,876 | 6/1987 | Paulsen | 324/207.21 |
| 4,926,015 | 5/1990 | Takahashi et al. | 340/624 |

FOREIGN PATENT DOCUMENTS

| | | | |
|---|---|---|---|
| 0112401 | 8/1980 | Japan | 60/585 |
| 21329 | 12/1985 | Japan . | |
| 1116802 | 6/1968 | United Kingdom | 340/624 |

Primary Examiner—Edward K. Look
Assistant Examiner—Thomas Denion
Attorney, Agent, or Firm—Carothers & Carothers

[57] ABSTRACT

In a hydraulic reservoir of a master cylinder for vehicle including: a main body having an internal space for storing brake fluid; a float provided with permanent magnet, so arranged as to be vertically movable in the internal space of the main body; a reed switch attached to the outside surface of the main body, the reed switch being actuated by magnetic force of the permanent magnet, when the float with permanent magnet is positioned under a predetermined level; and a hollow for attaching the reed switch to the outside surface of the main body, the reed switch is supported by a support member in the hollow, a rubber bush is tightly and elastically fitted to the inside wall of the hollow and a fixing member is so fitted to the hollow as to push the rubber bush to the support means, terminals of the reed switch being inserted tightly through holes of the rubber bush whereby the reed switch is held in the hollow.

3 Claims, 3 Drawing Sheets

HYDRAULIC RESERVOIR OF MASTER CYCLINDER

BACKGROUND OF THE INVENTION

1. Field of the Invention

This invention relates to a hydraulic reservoir of a master cylinder for vehicles.

2. Description of the Prior Art

For example, the Japanese Utility Model Registration Application Opening Gazzette No. 42624/1983 disclose the hydraulic reservoir of master cylinder in which the reed switch contained in the casing is inserted into the hollow portion formed in the outside wall of the main body for storing the brake fluid. When the vehicle is running, the casing or reed switch shakes in the hollow portion of the main body, due to the vibration or shock of the vehicle body and so the reed switch is often damaged.

SUMMARY OF THE INVENTION

Accordingly, it is an object of this invention to provide a hydraulic reservoir of master cylinder in which a reed switch can be protected from damage due to vibration or shock of the running vehicle body.

In accordance with an aspect of this invention, in a hydraulic reservoir of a master cylinder for vehicle including: (A) a main body having an internal space for storing brake fluid; (B) a float provided with permanent magnet, so arranged as to be vertically movable in said internal space of the main body; (C) a reed switch attached to the outside surface of said main body, said reed switch being actuated by magnetic force of said permanent magnet, when said float with permanent magnet is positioned under a predetermined level; and (D) hollow-forming means for attaching said switch to the outside surface of said main body, said reed switch is supported by support means in said hollow-forming means, sealing means is tightly and elastically fitted to the inside wall of said hollow-forming means, and fixing means is so fitted to said hollow-forming means as to push said sealing means to said support means, terminals of said reed switch being inserted tightly through holes of said sealing means whereby said reed switch is held in said hollow-forming means.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Next, protecting structures for reed switch in a hydraulic reservoir according to embodiments of this invention will be described with reference to the drawings.

Figure 1:
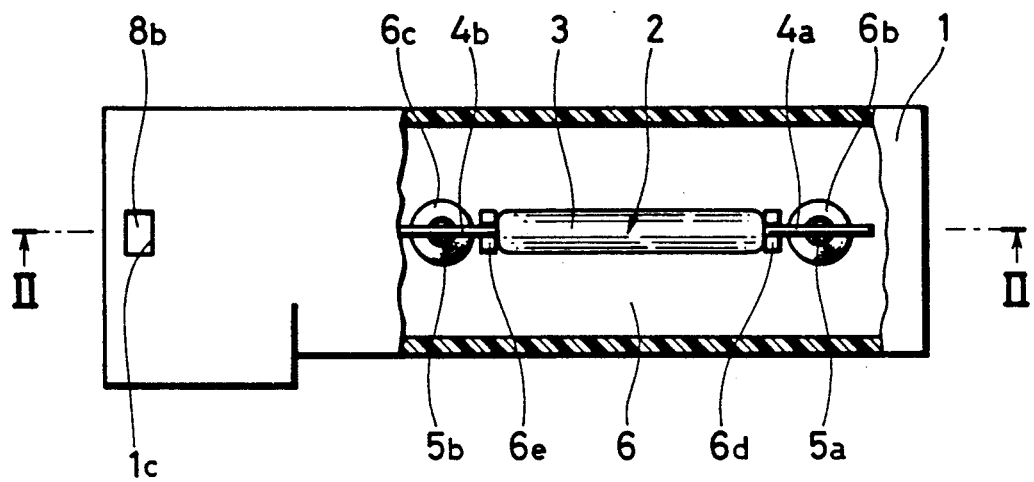
FIG. 1 is a partly-broken plan view of a protecting structure for reed switch according to a first embodiment of this invention.
Figure 2:
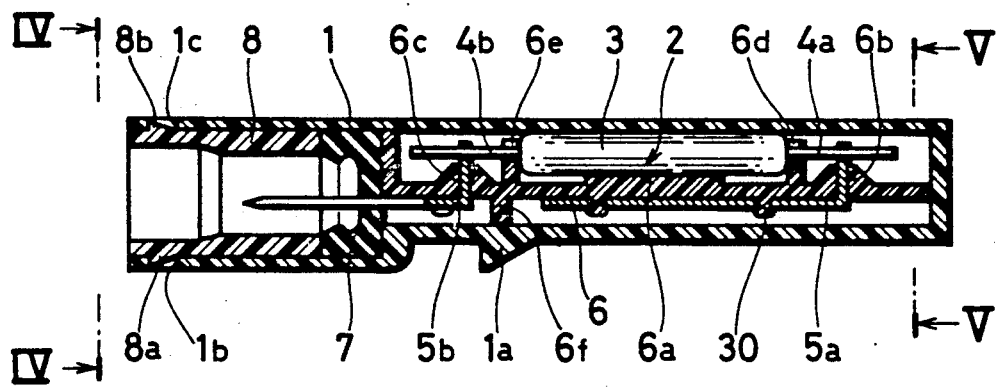
FIG. 2 is a cross-sectional view taken along the line II—II in FIG. 1.
Figure 3:
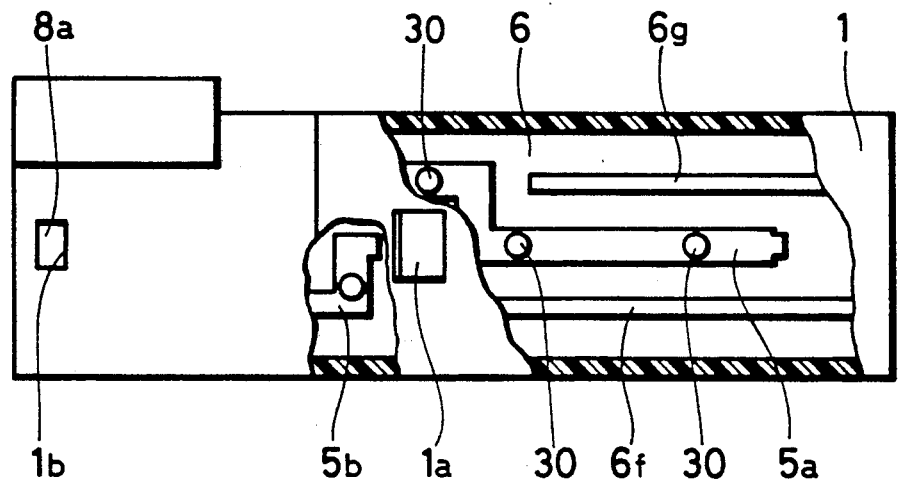
FIG. 3 is a partly-broken bottom view of the protecting structure for reed switch of FIG. 1.

FIG. 1 to FIG. 5 show a protecting structure for reed switch in a hydraulic reservoir according to a first embodiment of this invention. In FIG. 1 to FIG. 5, a reed switch 2 which has a well-known construction, is arranged in a casing 1 made of synthetic resin. In the reed switch 2, two contacts are contained in a sealed glass tube 3. A pair of electrodes 4a and 4b are projected outwards in opposite directions from the glass tube 3, as shown in FIG. 1 and FIG. 2, which are electrically connected to the contacts in the glass tube 3. As shown in FIG. 2, the glass tube 3 is supported on a flat projecting portion 6a of a support member 6 made of synthetic resin. The end surfaces of the glass tube 3 are pinched by upwardly-projecting portions 6d and 6e of the support member 6, and the electrodes 4a and 4b are supported by cutouts of the upwardly-projecting portions 6d and 6e. Further, conical projections 6b and 6c are formed integrally with the support member 6. Lead wires 5a and 5b in strip form as shown in FIG. 3 are attached to the lower surface of the support member 6. In the assembling operation of the lead wires 5a and 5b and support member 6, projections of the support member 6 are fitted to holes of the lead wires 5a and 5b, and then they are fixed to each other by the heat-welding method. Reference numerals 30 represent the heat welded portions. End portions of the lead wires 5a and 5b are bent, and they are inserted through slits made in the conical projections 6a and 6b. They are electrically connected to the electrodes 4a and 4b. U-shaped cutouts are made in the top ends of the lead wires 5a and 5b. The electrodes 4a and 4b are supported on the cutouts. For example, the top ends of the lead wires 5a and 5b are connected to the electrodes 4a and 4b by the soldering method.

Figure 4:
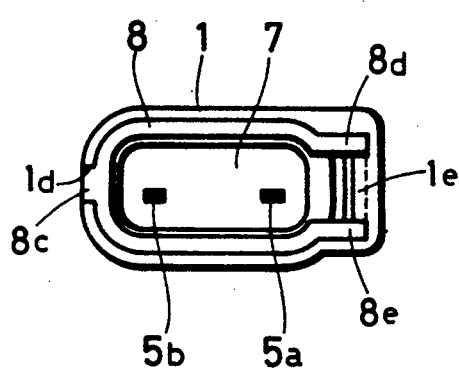
FIG. 4 is a front view of the protecting structure for reed switch of FIG. 1, taken along the line IV—IV in FIG. 2.
Figure 5:
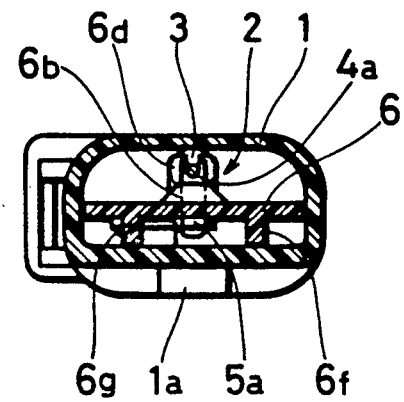
FIG. 5 is a cross-sectional view taken along the line V—V in FIG. 2.

The lead wires 5a and 5b extend in the manners shown in FIG. 3, along the lower surface of the support member 6, so that outer ends of the lead wires 5a and 5b are laterally arranged, spacing by a predetermined length from each other, as shown in FIG. 4. Although not shown, an electrical socket is connected to the outer ends of the lead wires 5a and 5b.

A rubber bush 7 is tightly and elastically fitted into the casing 1. The outer ends of the lead wires 5a and 5b are tightly inserted through holes of the rubber bush 7, and so they are securely supported by the rubber bush 7. A holding member 8 made of synthetic resin and having the U-shaped cross-section as shown in FIG. 4 is inserted into the casing 1. A lateral projection 8c of the holding member 8 is guided by a lateral cutout 1d of the casing 1. End portions 8d and 8e of the holding member 8 are guided by grooves formed by a flat projection 1e of the one inside wall of the casing 1. The holding member 8 is engaged with the casing 1. Hook portions 8a and 8b are formed in the peripheral wall of the holding member 8, as shown in FIG. 2, and they are engaged with cutouts 1b and 1c made in the casing 1. Thus, the holding member 8 is prevented from falling off from the casing 1. The rubber bush 7 is pushed to the support member 6 by the holding member 8. Accordingly, the rubber bush 7 is stably held by the holding member 8 and the inside surface of the casing 1.

The protecting structure shown in FIG. 1 to FIG. 5 is, as it is, inserted into a not shown hollow portion formed in a hydraulic reservoir. A recess is formed in the inside wall of the not-shown hollow portion. A hook portion 1a of the casing 1 of the protecting structure is engaged with the recess of the inside wall of the hollow portion. Thus, the protecting structure for reed switch is prevented from falling off from the hydraulic reservoir.

When the vibration or shock is transmitted to the protecting structure through the hydraulic reservoir from the chassis of the running vehicle, it is absorbed by the rubber bush 7, and so it is not applied to the lead wires 5a and 5b, and therefore to the electrodes 4a and 4b of the reed switch 2. Thus, the reed switch 2 can be protected from damage.

Figure 6:
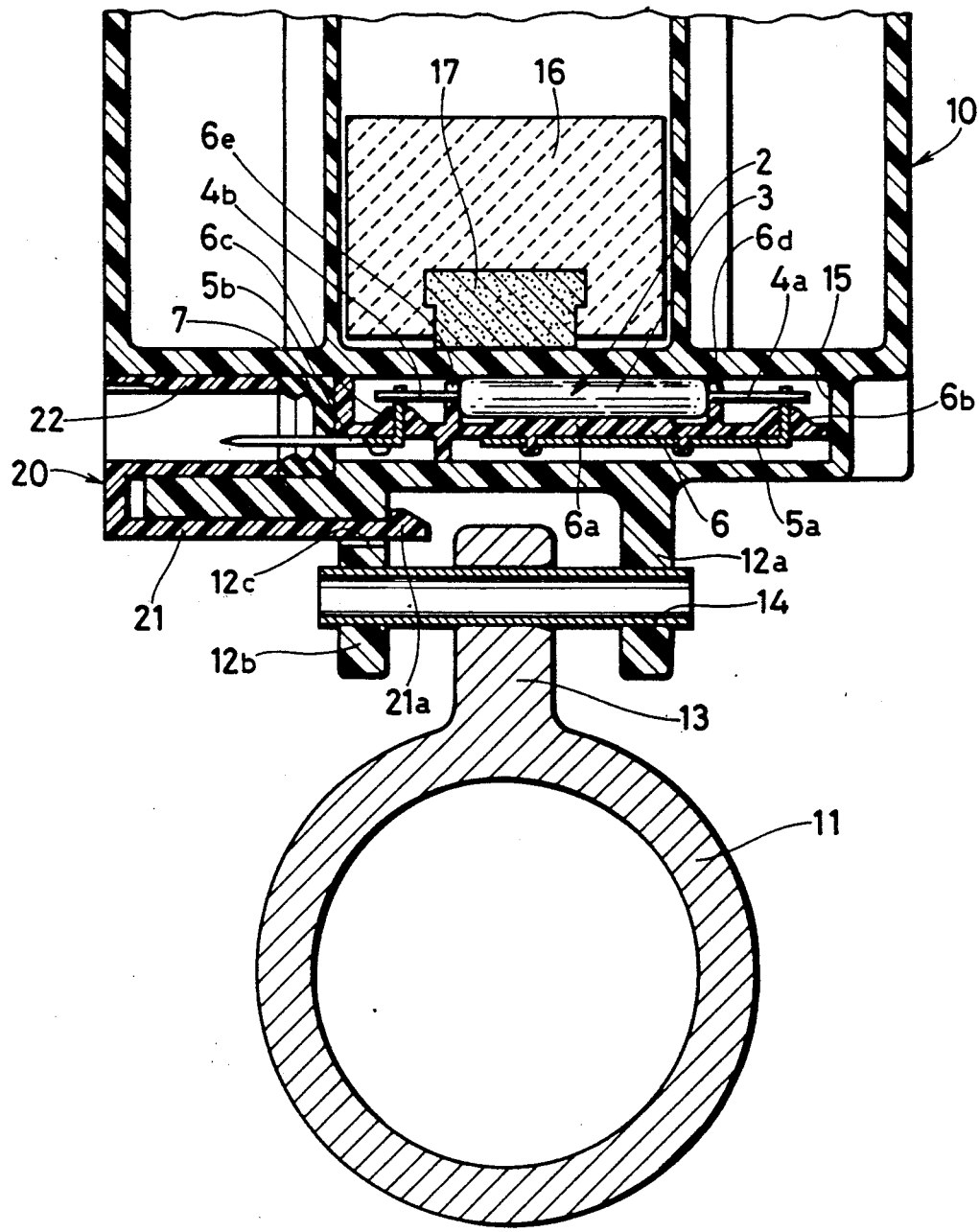
FIG. 6 is a cross-sectional view of an important part of a hydraulic reservoir with a protecting structure for reed switch according to a second embodiment of this invention.

FIG. 6 shows a hydraulic reservoir according to a second embodiment of this invention. Parts in FIG. 6 which correspond to those in FIG. 1 to FIG. 5, are denoted by the same reference numerals; the description of the same already presented will suffice.

In this embodiment, the combination of the reed switch 2 and support member 6 is not inserted into a casing. It is, as it is, inserted into a hollow portion 15 formed in the bottom portion of a main body 10 of the hydraulic reservoir. The rubber bush 7 also is inserted tightly and elastically fitted into the hollow portion 15. The protecting structure for reed switch is held in the main body 10 of the hydraulic reservoir by a holder 20.

A level sensor which consists of a permanent magnet 17 and a float 16, is so arranged in the internal space of the main body 10 as to be movable in the vertical direction. When brake fluid is poured into the internal space of the main body 10, the float 16 with permanent magnet 17 floats on the brake fluid. When the level of the brake fluid is decreased under a predetermined value, magnetic flux from the permanent magnet 17 actuates the reed switch 2.

Downward projections 12a and 12b are formed in the bottom of the hydraulic reservoir, and they are fixed to an upward projection 13 of a cylindrical body 11 of a master cylinder through a spring pin 14.

The holder 20 consists of an engaging portion 21 and a holding portion 22 for holding the rubber bush 7. The holding portion 22 functions as the holding member 8 in the first embodiment of FIG. 1 to FIG. 5. The engaging portion 21 is integrally formed with the holding portion 22. The holder 20 is made of synthetic resin. A hook 21a is formed in a top end of the engaging portion 21. The engaging portion 21 is inserted through an opening 12c formed in the one downward projection 12b of the main body 10. The hook 21a is engaged with the inside wall of the one downward projection 12b. Thus, the protecting structure for reed switch 2 is attached to the main body 10 of the hydraulic reservoir.

When the vibration or shock is transmitted to the protecting structure through the main body 10 of the hydraulic reservoir from the chassis of the running vehicle, it is absorbed by the rubber bush 7, and so it is not applied to the lead wires 5a and 5b, and therefore to the electrodes 4a and 4b of the reed switch 2. Thus, the reed switch 2 can be protected from damage.

While the preferred embodiments have been described, variations thereto will occur to those skilled in the art within the scope of the present inventive concepts which are delineated by the following claims.

For example, the electrodes 4a and 4b are projected outwards in the opposite directions from the glass tube 3 of the reed switch 2. This invention may be applied to a reed switch in which electrodes are projected outwards in the same direction from a glass tube.

Further, in the second embodiment of FIG. 6, the hollow portion 15 is formed under the bottom wall of the main body 10. Instead, a hollow portion may be formed over the bottom wall of the main body 10. In that case, a lengthwise projection is formed in the inside bottom wall of the main body 10. The combination of the reed switch 2 and support member 6 shown in FIG. 6 or the protecting structure shown in FIG. 1 to FIG. 5 is inserted into such a hollow portion.

What is claimed is:

1. In a hydraulic reservoir of a master cylinder for vehicle including:
   (A) a main body having an internal space for storing brake fluid;
   (B) a float so arranged as to be vertically moveable in said internal space of the main body;
   (C) a permanent magnet carried by the float;
   (D) a reed switch attached to the outside surface of said main body, said reed switch being actuated by magnetic force of said permanent magnet, when said float with said permanent magnet is positioned under a predetermined level; and
   (E) hollow-forming means for attaching said switch to the outside surface of said main body,
   the improvements comprising said reed switch being supported by a support means in said hollow-forming means; a sealing means tightly and elastically fitted to an inside wall portion of said hollow-forming means; and fixing means so fitted to said hollow-forming means in engagement with said sealing means so as to urge said sealing means toward said support means; and terminals of said reed switch being inserted tightly through holes formed in said sealing means whereby said reed switch is held in said hollow-forming means;
   said sealing means comprising an elastically flexible rubber means;
   said fixing means and sealing means being formed as molded parts, respectively, which are removably fitted to said hollow-forming means.

2. The improvements according to claim 1, in which said hollow-forming means is a cylindrical casing, and said cylindrical casing is engaged with a hollow portion formed in the outside of said main body.

3. The improvements according to claim 1, in which said hollow-forming means is a hollow portion formed in the outside of said main body, and said fixing means is engaged with a part of said main body.

* * * * *